United States Patent Office 2,860,103
Patented Nov. 11, 1958

2,860,103

MAKING GELLED HYDROCARBONS

Donnell M. Buchanan and Paul L. Menaul, Tulsa, Okla., assignors to Pan American Petroleum Corporation, a corporation of Delaware Application October 12, 1954, Serial No. 461,880

4 Claims. (Cl. 252—8.55)

This invention relates to an improved gelled hydrocarbon and a method of making same. It pertains more particularly to a temporary gel formed by emulsifying a small amount of water in a hydrocarbon liquid containing an oil soluble soap.

Hydrocarbon liquid gels which can be reverted to the viscosity of the liquid phase or sol are useful in a number of arts, including cleaning solvents and the well arts. In the well arts these temporary gels are used to plug zones in a well temporarily or to plug highly permeable zones penetrated by the well so that other less permeable zones can be tested or treated. Hydrocarbon gels which initially will not penetrate a formation and will revert automatically to non-viscous formation penetrating liquids or gases after a predetermined time delay are particularly useful in the formation fracturing art where an initially low-penetrating liquid is required to build up a pressure great enough to produce a deeply penetrating fracture or crack in the rock penetrated by the well. After a highly permeable fluid channel has thus been produced in the rock, the gel is reverted to a liquid or mixture of liquids having low viscosity which flow easily out of the channel and the formation and leave the channel open for the free flow of fluids to the well from the formations penetrated. Various gels of this type have been developed. The gel most commonly used in hydraulic fracturing of formations penetrated by a well is produced by mixing a small amount of a hydroxy aluminum soap and a small amount of water with a light hydrocarbon liquid. This gel is described in U. S. Patent 2,596,844, Clark. While this hydrocarbon-soap gel has been employed successfully, it has been expensive to use, due largely to the time required to mix the ingredients and obtain a highly viscous gel.

Figure 1:
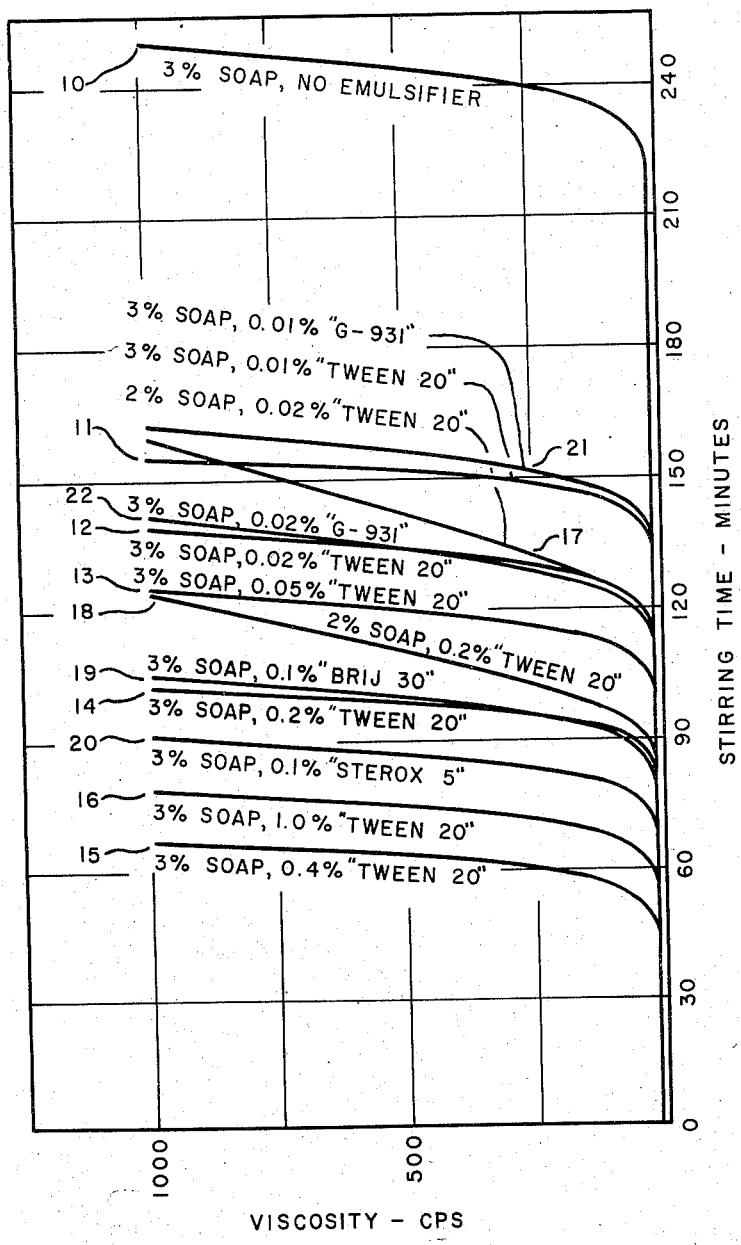
Figure 2:
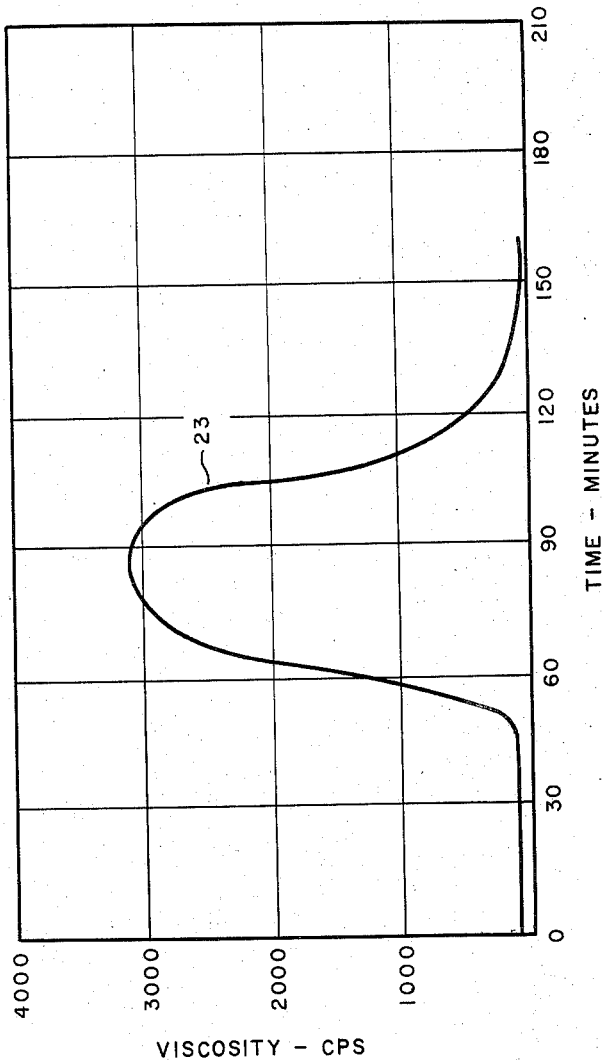

It is therefore an object of this invention to provide an improved temporary gel. It is another object of this invention to provide an improved method of producing a temporary hydrocarbon liquid soap gel. It is a more specific object of this invention to provide a method for rapidly gelling liquid hydrocarbons with hydroxy aluminum soaps and a small amount of water. Other objects of this invention will become apparent from the following description in which:

Figure 1 is a plot of the viscosity of various gels versus stirring time showing the development of viscosity up to 1,000 centipoises; and Figure 2 is a plot of the viscosity cycle versus stirring time including the viscosity build-up and the reversion to low viscosity of a preferred gel.

In accordance with this invention the napalm soap-hydrocarbon liquid gels are produced by adding to the customary hydrocarbon liquid soap-water mixture a small amount of nonionic emulsifying agent to accelerate and equalize the distribution of the water in the hydrocarbon liquid. These gels may then be used for any desired purpose including particularly the fracturing of formations in a well.

As pointed out in the above-mentioned Clark patent, the fracturing fluids used in the formation fracturing art are essentially low-viscosity hydrocarbon liquids containing mixed aluminum soaps of the napalm type. The hydrocarbon liquid may be either crude or refined and may include liquids similar to hydrocarbon liquids, such as the higher alcohols, animal and vegetable oils and the like in which the napalm-type soaps dissolve or disperse. The refined light or low molecular weight hydrocarbons such as gasoline, kerosene, naphtha and fuel oils are often preferred due to the fact that each of their compositions appears to be similar in the various areas even though produced by different manufacturers. The characteristics of a gel produced from these refined hydrocarbons can thus be predicted more accurately than the characteristics of a gel produced from an unrefined oil which has not been previously tested.

The soap bodying or gelling agent for the hydrocarbon liquid is an aluminum soap of the napalm type which has the ability to form hydrocarbon gels at low atmospheric temperatures and to revert the gel to a low-viscosity hydrocarbon liquid or sol after a suitable time delay. These napalm soaps are mixed soaps of aluminum having two components in which the hydroxy group or groups are attached to the aluminum rather than the acid radical. One component is an aluminum fatty acid soap typically aluminum laurate or a functionally related acid soap such as aluminum coconut fatty acid soap. The other component is an aluminum soap or soaps selected from the group including soaps of cycloparaffinic acids such as naphthenic acid and unsaturated acids such as oleic acid. Napalm soaps of this type are described in a number of places including for example U. S. Patent 2,390,609, an article entitled "Napalm" published in Industrial and Engineering Chemistry, vol. 38, No. 8 (August 1946), at pages 768–773 and an article entitled "The Use of Thickened Gasoline in Warfare," published in Armed Forces Chemical Journal, vol. IV, No. 3 (January 1951), at page 26 et seq.

The concentration of this napalm soap may be varied over a substantial range depending upon the maximum viscosity or rigidity desired in the resulting gel. Generally at least 2 per cent by weight is required in the light hydrocarbon liquids to produce a gel having sufficient viscosity to transport sand or other props used in the hydraulic fracturing process. A lower concentration may be used where a viscosity less than about a poise is desired. A concentration as high as 8 or 10 percent of the soap based on the weight of the hydrocarbon liquid is possible where a practically rigid gel is desired. A preferred concentration for use in the hydraulic fracturing process is in the range 3–4 percent napalm-type soap based on the weight of the hydrocarbon liquid which is typically kerosene.

As is well known the addition of a small amount of water or other aqueous oil-immiscible liquid, typically 1/2–3 percent water and preferably 1 percent water by volume based on the volume of hydrocarbon liquid, to a soap-hydrocarbon mixture will aid first in producing a viscous gel and second in reverting the gel after a suitable time delay to a non-viscous sol. More than about 3 percent water is not desirable since it accelerates the break down and in some cases even prevents the development of a high viscosity before break down commences. In typical hydraulic fracturing field operations these three ingredients in the proportions specified are mixed together by use of a stirrer or by circulating in a tank until a high viscosity is reached. A viscosity in the range 1,000–3,000 centipoises or greater as measured by the standard API Code 29 method and apparatus employing a Stormer viscosimeter rotating at 600 R. P. M. is customary. When this viscosity is obtained, the gel is pumped into a well and forced at high velocity into a part or fracture in a subterranean formation penetrated by the well. The gel reverts to a thin liquid in the formation and the thin liquid is removed therefrom when the well is produced. In addition to the above-described ingredients we incorporate a nonionic emulsifying agent in the gel-forming materials to accelerate the formation of the gel. We have found that, perhaps due to the density difference and high interfacial tension between the hydrocarbon liquid and the water, the water does not mix readily and evenly with the hydrocarbon liquid. As a result, as indicated by curve 10 of Figure 1, more than 4 hours stirring time may be required to produce a gel having 1,000 centipoises viscosity. This curve shows the viscosity in centipoises versus stirring time for producing a kerosene gel with 3 percent by weight napalm-type soap (Nuogel 718) available commercially from Nuodex Products Company, Incorporated, Elizabeth F, New Jersey and 1 percent by volume of water based on the weight and volume respectively of 500 cc. of kerosene. This soap, which is more specifically a hydroxy aluminum soap of a combination of tall oil and coconut acids, is described in detail in U. S. Patent 2,618,596 to Minich et al. These ingredients were placed in a large beaker and stirred with a paddle-type laboratory stirrer rotating at about 500 R. P. M. This apparatus and rate of stirring appears to produce a gel at about the same rate obtained by circulation through a pump in the field. The temperature of the mixture was maintained at about 78° F. The viscosity of the mixture was measured at intervals and plotted versus time to produce curve 10.

Similar tests were conducted in which the same ingredients were mixed. In each of these tests, however, as indicated by the legend on the curves, various concentrations of a number of different water soluble and oil soluble nonionic emulsifiers were added. The viscosity versus stirring time for each additive to the same standard kerosene-soap-water mixture is shown.

Curve 11, for example, shows the result where 0.01 percent of Tween 20 by volume based upon the volume of the kerosene was added to the standard kerosene-soap-water mixture used to produce curve 10. The stirring time required to make a 1,000 centipoise gel was reduced by about 100 minutes, a reduction of about 40 percent. Tween 20 which is manufactured by Atlas Powder Company is a water soluble nonionic emulsifier, specifically a polyoxyethylene sorbitan monolaurate having a molecular weight of about 1200 in which about 20 molecules of ethylene oxide are reacted with one molecule of sorbitan monolaurate. Curves 12, 13, 14, 15, and 16 show the results of similar tests in which the concentration of the same emulsifying agent in the standard mixture was respectively 0.02 percent, 0.05 percent, 0.2 percent, 0.4 percent and 1.0 percent. The optimum concentration, as indicated by curve 15, was at 0.4 percent of the emulsifying agent.

Curves 17 and 18 show the effect of varying both the soap concentration and the Tween 20 emulsifier concentration. In both of these tests the concentration of the oil soluble gelling agent (Nuogel 718) was reduced to 2 percent by weight based on the weight of the kerosene and the concentration of emulsifier was increased tenfold from 0.02 percent (curve 17) to 0.2 percent (curve 18). Without the emulsifier, the 2 percent soap mixture would not produce a gel of measurable viscosity in 8 hours at 78° F. The emulsifier was therefore clearly effective over a wide range in reducing the stirring time of the mixture.

Curve 19 shows the results of a similar test wherein the stirring time of the standard 3 percent soap mixture was substantially reduced by the addition of 0.1 percent by volume of a polyoxyethylene lauryl alcohol, specifically Brij 30 manufactured by Atlas Powder Company. This emulsifier is produced by reacting about 4–7 molecules of ethylene oxide with one molecule of lauryl alcohol to produce a compound having an average molecular weight of about 300. This emulsifier is of intermediate water solubility but can be easily dispersed in water. Curve 20 shows the results of a similar test wherein another slightly water-soluble or water-dispersible nonionic emulsifier, Sterox No. 5, at a concentration of 0.1 percent by volume was substituted for the Brij 30 emulsifier in the standard test. Sterox No. 5, sold by Monsanto Chemical Company, is a 15 percent water solution of a tertiary dodecyl mercaptan reacted with about 10 mols of ethylene oxide to give an average molecular weight of about 660.

Curves 21 and 22 show the results of similar tests with an oil soluble nonionic emulsifier. In these tests 0.01 percent and 0.02 percent respectively of G–931, a polyoxyethylene sorbitol cottonseed oil derivative having about 6 mols of ethylene oxide and 2 mols of cottonseed oil per mol of sorbitol, manufactured by Atlas Powder Company, was used instead of the above-mentioned water-soluble or water-dispersible emulsifiers. The curves are similar. Other oil-soluble emulsifiers such as the Spans, manufactured by Atlas Powder Company, produce similar results. Span 80, an anhydrosorbitol monooleate, is an example.

In these tests and in other tests where similar emulsifiers were used in the standard kerosene-soap-water mixture, it was noted that at a concentration of the emulsifier above the optimum range, above about 0.5 percent in most cases and above about 0.02 percent in the case of the oil-soluble emulsifiers, the emulsifier tended to become less effective and as the concentration was increased, it tended to prevent the emulsification of the water and formation of the gel. The maximum concentration as well as the optimum concentration can, therefore, generally be determined only by experiment with the particular ingredients for any gel. It will be apparent that any number of emulsifying agents of the nonionic type can be used instead of the examples given. Generally any nonionic emulsifier, i. e., any material which exhibits a surface tension reducing effect between water and a hydrocarbon liquid and which is neither substantially cationic nor substantially anionic may be used at a low concentration to accelerate the formation of a hydrocarbon liquid-soap-aqueous liquid gel. The concentration, which is generally determined by experiment for each type of emulsifier, is in general sufficient to reduce substantially, typically more than about 25 percent, the stirring time required to produce a temporary gel as compared to the stirring time required to produce a temporary gel with no emulsifier present. The minimum concentration, while also determined in any specific case by this experimental method, is generally at least about 0.01 percent by volume based on the volume of the hydrocarbon liquid. The viscosity build-up and break-down characteristics of a preferred composition are shown in curve 23 (Figure 2). In this case the components comprising 500 cc. of kerosene, 12 grams of soap (Nuogel 718), 5 cc. of water and 1 cc. of Tween 20 were first mixed for 30 minutes at 80° F. with a paddle-type laboratory stirrer turning at about 500 R. P. M. The temperature of the mixture was then raised to 158° F. and was held there throughout the test. After about 50 minutes' total stirring time, when the viscosity started to increase, the stirring rate was decreased substantially. The viscosity then increased rapidly to a maximum of greater than 3,000 centipoises as measured on the Stormer viscosimeter. Within about an hour from the start of the viscosity build-up, the viscosity had reduced to substantially the viscosity of the kerosene. A viscosity versus time characteristic of this nature is considered highly desirable since ample time is provided for injecting the viscous gel into the formations penetrated by a well and since practically no time is lost in waiting for the viscosity to break so that the well can be placed back on production.

From the foregoing it can be seen that by our procedure and composition, a hydrocarbon liquid can be gelled quite rapidly and that considerable time and expense is thus saved on a hydraulic fracturing job or an equivalent process. Manifestly, the invention as shown and described is capable of various modifications. Such modifications as may be construed to fall within the scope and meaning of the appended claims are also considered to be within the spirit and intent of the invention.

We claim:

1. A temporary gel prepared by adding to a hydrocarbon liquid between about 2 and 10 percent by weight of a napalm soap, between about ½ and 3 percent by volume of water, and sufficient nonionic emulsifier to accelerate the gelation of said gel.

2. A temporary gel prepared according to claim 1 wherein said emulsifier is polyoxyethylene sorbitan monolaurate having a molecular weight of about 1200.

3. A process for increasing the productivity of a formation penetrated by a well comprising introducing into said well adjacent said formation a temporary hydrocarbon liquid gel prepared by mixing with a low molecular weight hydrocarbon liquid between about 3 and 4 percent by weight of a napalm soap, between about ½ and 3 percent by volume of water, and sufficient nonionic emulsifying agent to accelerate the formation of said gel, said gel initially having a viscosity of greater than about 1000 centipoises as measured on the Stormer viscosimeter and being capable of reverting to a substantially thinner liquid on prolonged standing, applying to said gel sufficient pressure to part said formation and produce a highly permeable channel therein, flowing said gel into said channel to extend same deep into said formation, and then allowing said gel to remain in said formation until the viscosity of said gel is substantially reduced.

4. A well treating process according to claim 3 wherein the amount of said emulsifying agent is greater than about 0.01 percent by volume of said low molecular weight hydrocarbon liquid but substantially less than that amount which retards the formation of said gel.

References Cited in the file of this patent

UNITED STATES PATENTS

| | | |
|---|---|---|
| 2,398,173 | Brunstrum et al. | Apr. 9, 1946 |
| 2,475,589 | Bondi | July 12, 1949 |
| 2,724,439 | Brainerd | Nov. 22, 1955 |
| 2,742,426 | Brainerd | Apr. 17, 1956 |